United States Patent
Li et al.

(10) Patent No.: US 12,273,227 B2
(45) Date of Patent: Apr. 8, 2025

(54) COMMUNICATION METHOD AND APPARATUS UTILIZING RADIO FRAME NUMBER FOR INTER-CELL RANDOMIZATION

(71) Applicant: Huawei Technologies Co., Ltd., Shenzhen (CN)

(72) Inventors: Jun Li, Shanghai (CN); Xiaolei Tie, Shanghai (CN); Zhihu Luo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 17/673,605

(22) Filed: Feb. 16, 2022

(65) Prior Publication Data

US 2022/0173953 A1 Jun. 2, 2022

Related U.S. Application Data

(63) Continuation of application No. PCT/CN2020/109398, filed on Aug. 14, 2020.

(30) Foreign Application Priority Data

Aug. 16, 2019 (CN) .......................... 201910760366.1

(51) Int. Cl.
*H04L 27/26* (2006.01)
*H04L 5/00* (2006.01)
*H04L 27/00* (2006.01)

(52) U.S. Cl.
CPC ........ *H04L 27/2691* (2013.01); *H04L 5/0048* (2013.01); *H04L 27/0006* (2013.01); *H04L 27/26025* (2021.01); *H04L 27/2675* (2013.01)

(58) Field of Classification Search
CPC .............. H04L 27/2691; H04L 5/0048; H04L 27/0006; H04L 27/26025; H04L 27/2675;
(Continued)

(56) References Cited

U.S. PATENT DOCUMENTS

| 10,555,322 B2 * | 2/2020 | Xiong ................. H04W 74/004 |
| 2012/0327873 A1 * | 12/2012 | Kim ....................... H04W 72/23 370/329 |

(Continued)

FOREIGN PATENT DOCUMENTS

| CN | 104812057 A | 7/2015 |
| CN | 108347323 A | 7/2018 |

(Continued)

OTHER PUBLICATIONS

Ericsson, "Introduction of Even Further Enhanced MTC for LTE," 3GPP TSG-RAN1 Meeting #92bis, Sanya, China, R1-1807409, total 23 pages, 3rd Generation Partnership Project, Valbonne, France (Apr. 16-20, 2018).

(Continued)

*Primary Examiner* — Ivan O Latorre
(74) *Attorney, Agent, or Firm* — Leydig, Voit & Mayer, Ltd.

(57) ABSTRACT

A communication method and an apparatus are provided, to implement inter-cell interference randomization. The method includes: generating a demodulation reference signal based on a first parameter, where the first parameter includes a radio frame number of a radio frame for sending the demodulation reference signal; and sending the demodulation reference signal and a first channel, where the first channel is for carrying uplink control information, and the demodulation reference signal is a reference signal for demodulating the first channel.

18 Claims, 5 Drawing Sheets

(58) Field of Classification Search
CPC ... H04L 5/0051; H04L 5/0053; H04L 5/0007; H04L 5/0062; H04L 5/0073; H04L 5/0082; H04L 5/0094; H04L 5/1469; H04L 27/2613; H04J 11/005; H04W 72/0446; H04W 72/541
See application file for complete search history.

(56) References Cited

U.S. PATENT DOCUMENTS

| | | | | |
|---|---|---|---|---|
| 2014/0192783 | A1* | 7/2014 | Zhao | H04J 13/18 370/335 |
| 2014/0362769 | A1* | 12/2014 | Chen | H04J 11/0053 370/328 |
| 2015/0326356 | A1* | 11/2015 | Guan | H04W 52/54 370/330 |
| 2016/0057798 | A1 | 2/2016 | Chae et al. | |
| 2018/0048446 | A1 | 2/2018 | Jiang et al. | |
| 2019/0036746 | A1 | 1/2019 | Hwang et al. | |
| 2019/0058620 | A1* | 2/2019 | Liu | H04W 48/12 |
| 2019/0089504 | A1 | 3/2019 | Hwang et al. | |
| 2019/0215849 | A1* | 7/2019 | Ye | H04L 5/0094 |
| 2019/0222457 | A1* | 7/2019 | Wei | H04L 27/2613 |
| 2019/0357159 | A1* | 11/2019 | Pan | H04L 1/1861 |
| 2020/0099500 | A1* | 3/2020 | Huang | H04W 72/30 |
| 2020/0128498 | A1* | 4/2020 | Harada | H04L 5/0048 |
| 2020/0236524 | A1* | 7/2020 | Ye | H04L 5/0094 |
| 2020/0322199 | A1* | 10/2020 | Matsumura | H04L 5/0051 |
| 2022/0029766 | A1* | 1/2022 | Zhang | H04L 27/2613 |

FOREIGN PATENT DOCUMENTS

| | | |
|---|---|---|
| CN | 108988978 A | 12/2018 |
| JP | 2017513360 A | 5/2017 |
| JP | 2017530603 A | 10/2017 |
| JP | 6310019 B2 | 4/2018 |
| WO | 2018049035 A1 | 3/2018 |
| WO | 2018204630 A1 | 11/2018 |
| WO | 2019114710 A1 | 6/2019 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 15)," 3GPP TS 36.101 V15.6.0, total 1815 pages, 3rd Generation Partnership Project, Valbonne, France (Mar. 2019).

"3rd Generation Partnership Project; Technical Specification Group Radio Access Network; Evolved Universal Terrestrial Radio Access (E-UTRA); Physical channels and modulation (Release 15)," 3GPP TS 36.211 V15.6.0, total 239 pages, 3rd Generation Partnership Project, Valbonne, France (Jun. 2019).

"3rd Generation Partnership Project; Technical Specification Group Radio Access Network; Evolved Universal Terrestrial Radio Access (E-UTRA); Physical layer procedures (Release 15)," 3GPP TS 36.213 V15.6.0, total 551 pages, 3rd Generation Partnership Project, Valbonne, France (Jun. 2019).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.6.0, total 960 pages, 3rd Generation Partnership Project, Valbonne, France (Jun. 2019).

WI Rapporteur (Ericsson), "RAN1 agreements for Rel-15 Further NB-IoT enhancements [online]," 3GPP TSG-RAN WG1 Meeting #93 R1-1807590, Internet URL:https://www.3gpp.org/ftp/TSG_RAN/WG1_RL1/TSGR1_93/Docs/R1-1807590.zip, Total 22 pages, 3rd Generation Partnership Project, Valbonne, France (May 25, 2018).

* cited by examiner

FIG. 2

COMMUNICATION METHOD AND APPARATUS UTILIZING RADIO FRAME NUMBER FOR INTER-CELL RANDOMIZATION

CROSS-REFERENCE TO RELATED APPLICATIONS

This disclosure is a continuation of International Application No. PCT/CN2020/109398, filed on Aug. 14, 2020, which claims priority to Chinese Patent Application No. 201910760366.1, filed on Aug. 16, 2019. The disclosures of the aforementioned applications are hereby incorporated by reference in their entireties.

TECHNICAL FIELD

Embodiments of this disclosure relate to the field of mobile communication technologies, and in particular, to a communication method and an apparatus.

BACKGROUND

For a time division duplex (TDD) narrowband internet of things (NB-IoT) system, a narrowband physical uplink shared channel (NPUSCH) format 2 with a subcarrier spacing of 3.75 kHz supports only uplink/downlink configurations 1 and 4, as shown in Table 1. When the subcarrier spacing is 3.75 kHz, a slot (slot) is 2 ms and includes two consecutive subframes, and a radio frame may include a maximum of five slots. When a slot includes two consecutive uplink subframes, the slot may be for uplink signal transmission. Therefore, for the uplink/downlink configurations 1 and 4 in Table 1, when the slot includes subframes 2 and 3, the slot may be used for the 3.75-kHz NPUSCH format 2, and other slots each include a downlink subframe and/or a special subframe and cannot be used for the 3.75-kHz NPUSCH format 2. It may be understood that, in Table 1, an uplink subframe is U for short, a downlink subframe is D for short, and a special subframe is S for short.

TABLE 1

| Uplink/downlink configuration | Subframe number | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 1 | D | S | U | U | D | D | S | U | U | D |
| 4 | D | S | U | U | D | D | D | D | D | D |

In a conventional technology, a slot number is used to determine a demodulation reference signal (DMRS) sequence for the NPUSCH format 2. As the slot number changes, a different sequence index may be determined for a spreading sequence used to determine the DMRS sequence. Further, a changed spreading sequence may be determined, so that inter-cell interference randomization is implemented when a DMRS is sent.

It is clear that if the existing method is applied to the foregoing scenario of the 3.75-kHz NPUSCH format 2, only a specific value may be used as the slot number. As a result, the specific slot number is used each time a sequence index of the spreading sequence for the DMRS sequence is determined. Consequently, spreading sequences are the same in all slots (in a same cell), and inter-cell interference randomization cannot be well ensured, affecting performance of demodulating the NPUSCH format 2 by a network device. Currently, there is no corresponding solution to the preceding problems.

SUMMARY

Embodiments of this disclosure provide a communication method and an apparatus, to better implement inter-cell interference randomization.

According to a first aspect, an embodiment of this disclosure provides a communication method. The communication method may be applied to a terminal device, or may be applied to a structure or an apparatus deployed in the terminal device, for example, a chip, a chip system, or a circuit system. An example in which the method is applied to a terminal device is used for description. The method includes: The terminal device generates a demodulation reference signal based on a first parameter, and sends the demodulation reference signal and a first channel. The first parameter includes a radio frame number of a radio frame for sending the demodulation reference signal. The first channel is for carrying uplink control information, and the demodulation reference signal is a reference signal for demodulating the first channel.

According to the foregoing method, the terminal device may generate the demodulation reference signal based on the radio frame number of the radio frame for sending the demodulation reference signal. As the radio frame number of the radio frame for sending the demodulation reference signal is time variant, inter-cell interference randomization can be implemented by using the method. Further, performance of demodulating the first channel by a network device may be improved.

In a possible design, the generating, by the terminal device, a demodulation reference signal based on a first parameter includes: generating a first sequence based on the radio frame number; and generating the demodulation reference signal based on the first sequence.

In a possible design, the generating, by the terminal device, a first sequence based on the radio frame number includes: determining a sequence index based on the radio frame number and a pseudo-random sequence; and determining the first sequence based on the sequence index.

In a possible design, the determining, by the terminal device, a sequence index based on the radio frame number and a pseudo-random sequence includes: determining the sequence index according to a formula $(\Sigma_{i=0}^{7} c(8f(n_f)+i) \cdot 2^i)$ mod 3, where c(n) is the pseudo-random sequence, $n_f$ is the radio frame number, $\Sigma$ is a summation operation, mod is a modulo operation, and $f(n_f)$ is determined based on the radio frame number.

In a possible design, $f(n_f)$ satisfies the following formula:

$$f(n_f) = n_f,$$
$$f(n_f) = n_f \bmod X,$$
$$f(n_f) = 5n_f + n_s,$$
$$f(n_f) = (5n_f + n_s) \bmod Z,$$
$$f(n_f) = 10n_f + \left\lfloor \frac{n_s}{2} \right\rfloor, \text{ or}$$
$$f(n_f) = \left(10n_f + \left\lfloor \frac{n_s}{2} \right\rfloor\right) \bmod Z,$$

where
   $n_s$ is a slot number of a slot for sending the demodulation reference signal, $\lfloor \rfloor$ is a round-down operation, X is an integer greater than 1, and Z is an integer greater than 1. According to the method, the terminal device may determine the sequence index based on $n_f$ of the radio frame for sending the demodulation reference signal. Because $n_f$ is time variant, different sequence indexes may be determined in different slots. Further, different first sequences may be determined in the different slots based on the different sequence indexes. In this way, inter-cell interference randomization can be implemented, improving performance of demodulating the first channel by the network device.

In a possible design, the generating, by the terminal device, the demodulation reference signal based on the first sequence includes: generating a second sequence based on a cell identifier; generating a sequence of the demodulation reference signal based on the first sequence and the second sequence; and mapping the sequence of the demodulation reference signal to a time-frequency resource. The time-frequency resource is for sending the demodulation reference signal.

In a possible design, the first sequence is $[\overline{w}(0), \overline{w}(1), \overline{w}(2)]$, the second sequence is $[\overline{r}_u(0), \overline{r}_u(1), \ldots, \overline{r}_u(K-1)]$, and the sequence of the demodulation reference signal is $r_u(3n+m) = \overline{w}(m)\overline{r}_u(n)$, where K is a length of the second sequence, $u = N_{ID}^{cell} \mod 16$, $N_{ID}^{cell}$ is the cell identifier, a value of m is $\{0, 1, 2\}$, and a value of n is $\{0, 1, 2, \ldots, K-1\}$.

In a possible design, the first channel is a physical uplink shared channel, and a format of the physical uplink shared channel is a format 2.

In a possible design, a subcarrier spacing of the first channel is 3.75 kHz, and the first channel supports an uplink/downlink configuration 1 and/or an uplink/downlink configuration 4 in time division duplex (TDD).

In a possible design, the first channel is transmitted by using two consecutive uplink subframes of a radio frame.

According to a second aspect, an embodiment of this disclosure provides a communication method. The communication method may be applied to a network device, or may be applied to a structure or an apparatus deployed in the network device, for example, a chip, a chip system, or a circuit system. An example in which the method is applied to a network device is used for description. The method includes: The network device receives a demodulation reference signal and a first channel. The demodulation reference signal is generated based on a first parameter, where the first parameter includes a radio frame number of a radio frame for sending the demodulation reference signal. The first channel is for carrying uplink control information, and the demodulation reference signal is a reference signal for demodulating the first channel.

In a possible design, the demodulation reference signal is generated based on a first sequence, and the first sequence is generated based on the radio frame number.

In a possible design, the first sequence is determined based on a sequence index, and the sequence index is determined based on the radio frame number and a pseudo-random sequence.

In a possible design, the sequence index is determined according to a formula $(\Sigma_{i=0}^{7} c(8f(n_f)+i) \cdot 2^i) \mod 3$, where $c(n)$ is the pseudo-random sequence, $n_f$ is the radio frame number, $\Sigma$ is a summation operation, mod is a modulo operation, and $f(n_f)$ is determined based on the radio frame number.

In a possible design, $f(n_f)$ satisfies the following formula:

$$f(n_f) = n_f,$$
$$f(n_f) = n_f \mod X,$$
$$f(n_f) = 5n_f + n_s,$$
$$f(n_f) = (5n_f + n_s) \mod Z,$$
$$f(n_f) = 10n_f + \left\lfloor \frac{n_s}{2} \right\rfloor, \text{ or}$$
$$f(n_f) = \left(10n_f + \left\lfloor \frac{n_s}{2} \right\rfloor\right) \mod Z,$$

where
   $n_s$ is a slot number of a slot for sending the demodulation reference signal, $\lfloor \rfloor$ is a round-down operation, X is an integer greater than 1, and Z is an integer greater than 1.

In a possible design, a sequence of the demodulation reference signal is generated based on the first sequence and a second sequence, the second sequence is generated based on a cell identifier, and the sequence of the demodulation reference signal is mapped to a time-frequency resource. The time-frequency resource is for sending the demodulation reference signal.

In a possible design, the first sequence is $[\overline{w}(0), \overline{w}(1), \overline{w}(2)]$, the second sequence is $[\overline{r}_u(0), \overline{r}_u(1), \ldots, \overline{r}_u(K-1)]$, and the sequence of the demodulation reference signal is $r_u(3n+m) = \overline{w}(m)\overline{r}_u(n)$, where K is a length of the second sequence, $u = N_{ID}^{cell} \mod 16$, $N_{ID}^{cell}$ is the cell identifier, a value of m is $\{0, 1, 2\}$, and a value of n is $\{0, 1, 2, \ldots, K-1\}$.

In a possible design, the first channel is a physical uplink shared channel, and a format of the physical uplink shared channel is a format 2.

In a possible design, a subcarrier spacing of the first channel is 3.75 kHz, and the first channel supports an uplink/downlink configuration 1 and/or an uplink/downlink configuration 4 in time division duplex (TDD).

In a possible design, the first channel is transmitted by using two consecutive uplink subframes of a radio frame.

According to a third aspect, an embodiment of this disclosure provides a communication apparatus. The communication apparatus may be a terminal device, or may be a structure or an apparatus deployed in the terminal device, for example, a chip, a chip system, or a circuit system. The communication apparatus includes at least one processor. The at least one processor is configured to: be coupled to a memory, and read and execute instructions stored in the memory, to generate a demodulation reference signal based on a first parameter and send the demodulation reference signal and a first channel. The first parameter includes a radio frame number of a radio frame for sending the demodulation reference signal. The first channel is for carrying uplink control information, and the demodulation reference signal is a reference signal for demodulating the first channel.

In a possible design, the processor is specifically configured to: generate a first sequence based on the radio frame number, and generate the demodulation reference signal based on the first sequence.

In a possible design, the processor is specifically configured to: determine a sequence index based on the radio frame number and a pseudo-random sequence, and determine the first sequence based on the sequence index.

In a possible design, the processor is specifically configured to: determine the sequence index according to a formula $(\Sigma_{i=0}^{7} c(8f(n_f)+i) \cdot 2^i) \mod 3$, where $c(n)$ is the pseudo-random sequence, $n_f$ is the radio frame number, $\Sigma$ is a summation operation, mod is a modulo operation, and $f(n_f)$ is determined based on the radio frame number.

In a possible design, $f(n_f)$ satisfies the following formula:

$$f(n_f) = n_f,$$
$$f(n_f) = n_f \mod X,$$
$$f(n_f) = 5n_f + n_s,$$
$$f(n_f) = (5n_f + n_s) \mod Z,$$
$$f(n_f) = 10n_f + \left\lfloor \frac{n_s}{2} \right\rfloor, \text{ or}$$
$$f(n_f) = \left(10n_f + \left\lfloor \frac{n_s}{2} \right\rfloor\right) \mod Z,$$

where
  $n_s$ is a slot number of a slot for sending the demodulation reference signal, $\lfloor \rfloor$ is a round-down operation, X is an integer greater than 1, and Z is an integer greater than 1.

In a possible design, the processor is specifically configured to: generate a second sequence based on a cell identifier, generate a sequence of the demodulation reference signal based on the first sequence and the second sequence, and map the sequence of the demodulation reference signal to a time-frequency resource. The time-frequency resource is for sending the demodulation reference signal.

In a possible design, the first sequence is $[\overline{w}(0), \overline{w}(1), \overline{w}(2)]$, the second sequence is $[\overline{r}_u(0), \overline{r}_u(1), \ldots, \overline{r}_u(K-1)]$, and the sequence of the demodulation reference signal is $r_u(3n+m) = \overline{w}(m)\overline{r}_u(n)$, where K is a length of the second sequence, $u = N_{ID}^{cell} \mod 16$, $N_{ID}^{cell}$ is the cell identifier, a value of m is $\{0, 1, 2\}$, and a value of n is $\{0, 1, 2, \ldots, K-1\}$.

In a possible design, the first channel is a physical uplink shared channel, and a format of the physical uplink shared channel is a format 2.

In a possible design, a subcarrier spacing of the first channel is 3.75 kHz, and the first channel supports an uplink/downlink configuration 1 and/or an uplink/downlink configuration 4 in time division duplex (TDD).

In a possible design, the first channel is transmitted by using two consecutive uplink subframes of a radio frame.

Optionally, the communication apparatus may further include the memory. The processor is coupled to the memory, and the processor may read the instructions in the memory, to implement the functions of the processor.

Optionally, the communication apparatus may further include a transceiver configured to support the communication apparatus in receiving or sending signaling or data. For example, the transceiver may be configured to send the demodulation reference signal and the first channel to a network device.

According to a fourth aspect, an embodiment of this disclosure provides a communication apparatus. The communication apparatus may be a network device, or may be a structure or an apparatus deployed in the network device, for example, a chip, a chip system, or a circuit system. The communication apparatus includes at least one processor. The at least one processor is configured to: be coupled to a memory, and read and execute instructions stored in the memory, to receive a demodulation reference signal and a first channel. The demodulation reference signal is generated based on a first parameter, the first parameter includes a radio frame number of a radio frame for sending the demodulation reference signal, the first channel is for carrying uplink control information, and the demodulation reference signal is a reference signal for demodulating the first channel.

In a possible design, the demodulation reference signal is generated based on a first sequence, and the first sequence is generated based on the radio frame number.

In a possible design, the first sequence is determined based on a sequence index, and the sequence index is determined based on the radio frame number and a pseudo-random sequence.

In a possible design, the sequence index is determined according to a formula $(\Sigma_{i=0}^{7} c(8f(n_f)+i) \cdot 2^i) \mod 3$, where $c(n)$ is the pseudo-random sequence, $n_f$ is the radio frame number, $\Sigma$ is a summation operation, mod is a modulo operation, and $f(n_f)$ is determined based on the radio frame number.

In a possible design, $f(n_f)$ satisfies the following formula:

$$f(n_f) = n_f,$$
$$f(n_f) = n_f \mod X,$$
$$f(n_f) = 5n_f + n_s,$$
$$f(n_f) = (5n_f + n_s) \mod Z,$$
$$f(n_f) = 10n_f + \left\lfloor \frac{n_s}{2} \right\rfloor, \text{ or}$$
$$f(n_f) = \left(10n_f + \left\lfloor \frac{n_s}{2} \right\rfloor\right) \mod Z,$$

where
  $n_s$ is a slot number of a slot for sending the demodulation reference signal, $\lfloor \rfloor$ is a round-down operation, X is an integer greater than 1, and Z is an integer greater than 1.

In a possible design, a sequence of the demodulation reference signal is generated based on the first sequence and a second sequence, the second sequence is generated based on a cell identifier, and the sequence of the demodulation reference signal is mapped to a time-frequency resource. The time-frequency resource is for sending the demodulation reference signal.

In a possible design, the first sequence is $[\overline{w}(0), \overline{w}(1), \overline{w}(2)]$, the second sequence is $[\overline{r}_u(0), \overline{r}_u(1), \ldots, \overline{r}_u(K-1)]$, and the sequence of the demodulation reference signal is $r_u(3n+m) = \overline{w}(m)\overline{r}_u(n)$, where K is a length of the second sequence, $u = N_{ID}^{cell} \mod 16$, $N_{ID}^{cell}$ is the cell identifier, a value of m is $\{0, 1, 2\}$, and a value of n is $\{0, 1, 2, \ldots, K-1\}$.

In a possible design, the first channel is a physical uplink shared channel, and a format of the physical uplink shared channel is a format 2.

In a possible design, a subcarrier spacing of the first channel is 3.75 kHz, and the first channel supports an uplink/downlink configuration 1 and/or an uplink/downlink configuration 4 in time division duplex (TDD).

In a possible design, the first channel is transmitted by using two consecutive uplink subframes of a radio frame.

Optionally, the communication apparatus may further include the memory. The processor is coupled to the memory, and the processor may read the instructions in the memory, to implement the functions of the processor.

Optionally, the communication apparatus may further include a transceiver configured to support the communication apparatus in receiving or sending signaling or data. For example, the transceiver may be configured to receive the demodulation reference signal and the first channel from the terminal device.

According to a fifth aspect, an embodiment of this disclosure provides a communication apparatus, to implement the method in any one of the first aspect or the designs of the first aspect. The communication apparatus includes corresponding functional modules, for example, a processing unit and a transceiver unit, that are configured to implement the steps in the foregoing method.

According to a sixth aspect, an embodiment of this disclosure provides a communication apparatus, to implement the method in any one of the second aspect or the designs of the second aspect. The communication apparatus includes corresponding functional modules, for example, a processing unit and a transceiver unit, that are configured to implement the steps in the foregoing method.

According to a seventh aspect, an embodiment of this disclosure provides a chip or a chip system. The chip or the chip system may be coupled to a transceiver to implement the method in any one of the first aspect and the possible designs of the first aspect, or the method in any one of the second aspect and the possible designs of the second aspect. The chip system includes at least one chip, and may further include another discrete component.

According to an eighth aspect, an embodiment of this disclosure provides a communication system. The system includes the terminal device in any one of the third aspect or the possible designs of the third aspect, and the network device in any one of the fourth aspect or the possible designs of the fourth aspect.

According to a ninth aspect, an embodiment of this disclosure provides a communication system. The system includes the communication apparatus in the fifth aspect, and the communication apparatus in the sixth aspect.

According to a tenth aspect, an embodiment of this disclosure provides a computer-readable storage medium. The computer-readable storage medium stores a computer program. When being executed by the processor, the computer program implements the method in any one of the first aspect and the possible designs of the first aspect, or the method in any one of the second aspect and the possible designs of the second aspect.

According to an eleventh aspect, an embodiment of this disclosure provides a computer program product. When the computer program product is run by a computer, the computer can be enabled to implement any one of the first aspect and the possible designs of the first aspect, or any one of the second aspect and the possible designs of the second aspect.

BRIEF DESCRIPTION OF DRAWINGS

FIG. 2 is a schematic diagram of slot division according to an embodiment of this disclosure;

DESCRIPTION OF EMBODIMENTS

Figure 1:
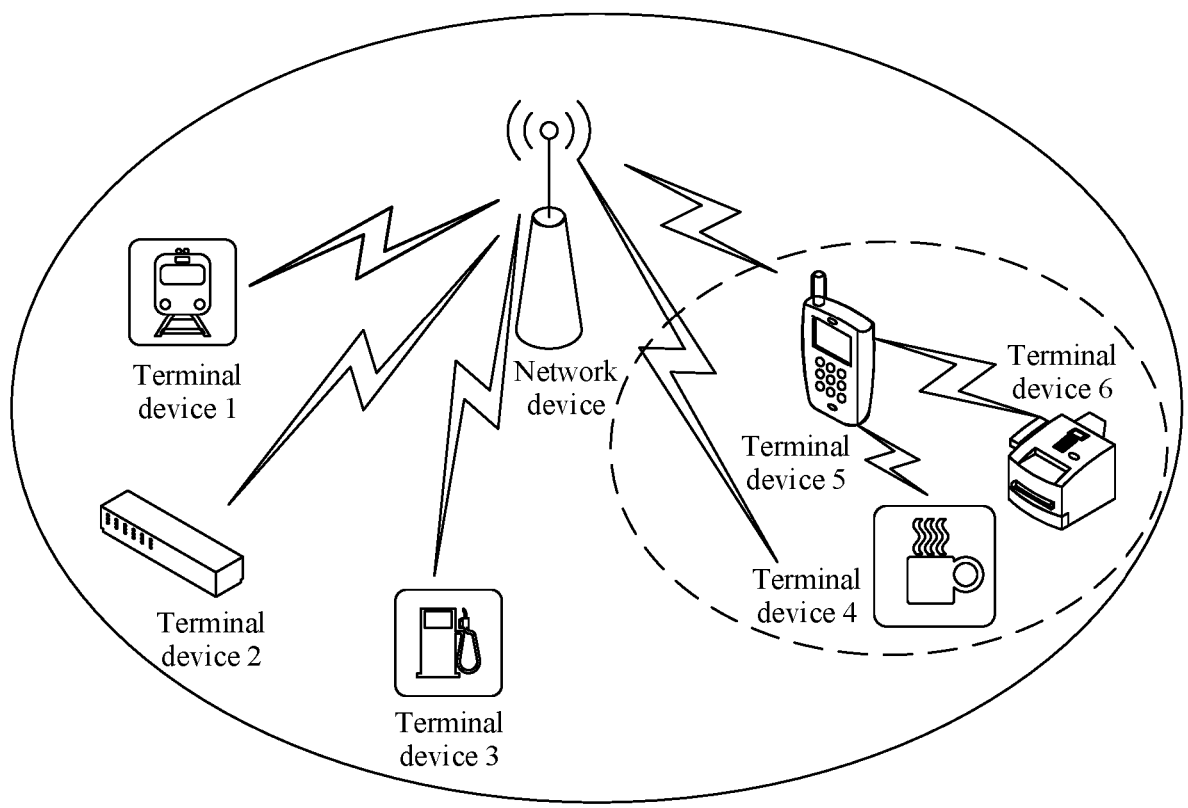
FIG. 1 is a schematic diagram of a network architecture according to an embodiment of this disclosure.

To make the objectives, technical solutions, and advantages of the embodiments of this disclosure clearer, the following further describes the embodiments of this disclosure in detail with reference to the accompanying drawings.

The following describes some terms in the embodiments of this disclosure, to facilitate understanding of a person skilled in the art.

(1) A terminal device may be a device that provides a user with voice and/or data connectivity, for example, may be a handheld device with a wireless connection function, or a processing device connected to a wireless modem. The terminal device may communicate with a core network through a radio access network (RAN), and exchange voice and/or data with the RAN. The terminal device may be referred to as user equipment (UE), a wireless terminal device, a mobile terminal device, a subscriber unit, a subscriber station, a mobile station, a mobile, a remote station, an access point (AP), a remote terminal, an access terminal, a user terminal, a user agent, a user device, or the like. For example, the terminal device may include a mobile phone (or referred to as a "cellular" phone), or a computer having a mobile terminal device, or a portable, pocket-sized, handheld, computer built-in, or in-vehicle mobile apparatus, or a wearable intelligent device. For example, the terminal device may be a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in the embodiments of this disclosure, the terminal device may alternatively be a wearable device. The wearable device may also be referred to as a wearable intelligent device, and is a general term of wearable devices that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

(2) A network device includes an access network (AN) device, for example, a base station (for example, an access point), and may be a device that is in an access network and that communicates with a wireless terminal device over an air interface through one or more cells. The network device may be configured to mutually convert a received over-the-air frame and an Internet Protocol (IP) packet and serve as a router between the terminal device and a rest portion of the access network, where the rest portion of the access network may include an IP network. The network device may further coordinate attribute management of the air interface. For example, the network device may include an evolved NodeB (NodeB, eNB, or eNodeB, evolved Node B) in a long term evolution (LTE) system or an LTE-advanced (LTE-A) system, or may include a next generation NodeB (gNB) in a fifth generation (5G) mobile communication technology new radio (NR) system, or may include a centralized unit (CU) and a distributed unit (DU) in a cloud access network (Cloud RAN) system. This is not limited in the embodiments of this disclosure.

(3) Machine type communication (MTC), also referred to as machine-to-machine (M2M) communication or Internet of Things (IoT) communication, as a name implies, is communication between objects. Further, machine type communication is communication between machines, and a communication node in this communication mode may be referred to as an MTC terminal. Future Internet of things communication may mainly cover smart grids, smart agriculture, smart transportation, smart home, medical detection and monitoring, logistics detection, industrial detection and monitoring, the internet of vehicles, intelligent communities, environmental monitoring, and the like.

A type of important MTC communication system is a communication system based on an existing cellular network infrastructure, and this type of MTC communication is usually referred to as cellular MTC or cellular IoT (which is CIoT for short). The 3rd generation partnership project (3GPP) standardization organization has been paying close attention to development of cellular MTC and has actively carried out standardization of related technologies. Currently, a cellular MTC service mainly poses the following requirements on a network and UE:

Wide coverage: A current visible MTC service usually does not need a very high service rate, but needs a capability to support wide coverage. The large coverage means that an MTC base station uses a strong coverage enhancement technology to provide a communication service for user equipment with a high penetration loss (20 dB). For example, user equipments in smart household and intelligent meter reading services, for example, a smart water/electricity meter, are usually installed indoors or even in a basement. An existing cellular network technology can hardly provide a reliable communication service for devices at these locations, but an MTC base station needs to provide a stable connection service for such type of devices.

Large connection quantity: For Internet of Things terminal devices deployed on a large scale, such as smart water/electricity meters, smart communities, surveillance devices, vehicles, and wearable devices, one MTC base station may cover a huge quantity of terminal devices of this type (which is more than tens of thousands or even hundreds of thousands) that is far higher than an existing quantity of mobile terminals.

Low costs: Costs of MTC terminal devices need to be lower than costs of existing mobile terminals, and the low costs are a prerequisite for massively deploying MTC devices.

Low power consumption: Because of diversified actual application and various deployment environments of MTC terminal devices, the MTC terminal devices are usually powered by using batteries. However, replacing batteries for the massive devices consumes enormous manpower costs and time costs. Therefore, functional components of an MTC device usually need to have an extremely low power consumption level, so that the device can have a longer standby time, thereby reducing a quantity of times of battery replacement.

(4) Narrowband internet of things (NB-IoT) is an MTC-oriented network and an important network in the future communication field. Currently, in the 3GPP standard, a new air interface is designed based on a cellular network to carry an IoT service by fully using characteristics of a narrowband technology. This type of IoT is referred to as NB-IoT. Compared with a conventional cellular network, a service and a terminal device in an NB-IoT system have the following features:

(1) Low service rate: Compared with a conventional cellular network, an NB-IoT service generates smaller data packets, and is usually delay-insensitive.

(2) Massive-connection requirement: One NB-IoT base station may cover a huge quantity of internet of things terminal devices deployed on a large scale, such as smart water/electricity meters, smart households, vehicles, and wearable devices. For example, a quantity of the terminal devices may exceed tens of thousands.

(3) Low cost requirement: Compared with an existing cellular network terminal device, the NB-IoT system requires a lower-cost terminal device, to implement massive deployment of terminal devices. A low cost requirement requires very low implementation complexity of the terminal device.

(4) Low power consumption requirement: The NB-IoT system requires lower power consumption of the terminal device, to save battery power of the terminal device, ensure extra-long standby time of the terminal device, and reduce labor costs of battery replacement.

(5) Coverage enhancement requirement: Most NB-IoT systems are deployed in environments with poor network coverage. For example, electricity meters and water meters are usually installed indoors or in basements in which wireless network signals are very poor. Therefore, coverage enhancement technologies are required to enhance network coverage.

To meet the foregoing requirements, the NB-IoT system has many unique designs. In addition, a manner of repeated sending is used for a control channel (for example, a narrowband physical downlink control channel (NPDCCH)) and a data channel (for example, a narrowband physical downlink shared channel (NPDSCH) or a narrowband physical uplink shared channel (NPUSCH)) of the NB-IoT system, to implement deep coverage. That is, same content is sent repeatedly for hundreds of times, to increase a possibility of successfully receiving the content by a terminal device with poor coverage. There may be only one resource block (RB) for a deployed bandwidth, that is, 180 kHz, so that coverage of a cell is enhanced by 20 dB. In addition, a battery life of the terminal device can reach 10 years by reducing power consumption and complexity of the terminal device.

(5) A DMRS is a main reference signal for estimating a channel characteristic. A distribution interval of the DMRS in time domain may be less than or equal to channel coherence duration, to estimate a time-variant channel more accurately.

(6) A subcarrier spacing (SCS) is a value of a spacing between center locations or peak locations of two adjacent subcarriers in frequency domain in an orthogonal frequency division multiplexing (OFDM) system. For example, the SCS may be 15 kHz, 30 kHz, 60 kHz, 120 kHz, 240 kHz, 480 kHz, or the like. For example, different subcarrier spacings may be integer multiples of 2. It can be understood that the subcarrier spacing may alternatively be designed to another value. For example, a subcarrier spacing in an LTE system is 15 kHz, and a subcarrier spacing in an NR system may be 15 kHz, 30 kHz, 60 kHz, 120 kHz, or the like. The subcarrier spacing in the NB-IoT system may be 3.75 kHz or 15 kHz.

Lengths of slots corresponding to different subcarrier spacings are different. For example, a length of a slot corresponding to a subcarrier spacing of 15 kHz is 0.5 ms, and a length of a slot corresponding to a subcarrier spacing of 60 kHz is 0.125 ms. Correspondingly, one symbol corresponding to different subcarrier spacings may alternatively be of different lengths.

(7) The terms "system" and "network" may be used interchangeably in the embodiments of this disclosure. A plurality of means two or more. In view of this, "a plurality of" may also be understood as "at least two" in the embodiments of this disclosure. "At least one" may be understood as one or more, for example, one, two, or more. For example, "include at least one" means "include one, two, or more", and there is no limitation on which is included. For example, "include at least one of A, B, and C" may mean "include A, B, or C", "include A and B", "include A and C", "include B and C", or "include A, B, and C". The term "and/or" describes association between associated objects and indicates that three relationships may exist. For example, A and/or B may indicate the following three cases: Only A exists, both A and B exist, and only B exists. In addition, the character "/" generally indicates an "or" relationship between the associated objects, unless otherwise specified.

Unless otherwise specified, ordinal terms such as "first" and "second" mentioned in the embodiments of this disclosure are for distinguishing between a plurality of objects, but are not for limiting an order, a time sequence, a priority, or a level of importance among the plurality of objects.

The embodiments of this disclosure may be applied to various communication systems such as an NB-IoT system, an IoT system, an MTC system, an eMTC system, an LTE system, an LTE-A system, a new radio (NR) system, or a new communication system emerging in future communication development. The communication method provided in the embodiments of this disclosure may be used, provided that an entity in a communication system uses different spreading sequences at different time points to achieve an objective of interference randomization.

FIG. 1 is a communication system applicable to an embodiment of this disclosure. The communication system shown in FIG. 1 includes a network device and six terminal devices. Any one of a terminal device 1 to a terminal device 6 may send uplink data to the network device. In addition, the terminal device 4 to the terminal device 6 may constitute a communication subsystem. The network device may send downlink information to the terminal device 1, the terminal device 2, the terminal device 3, and the terminal device 5. The terminal device 5 may send the downlink information to the terminal device 4 and the terminal device 6 based on a device-to-device (D2D) technology. FIG. 1 is merely a schematic diagram. A type of a communication system, a quantity and a type of devices included in the communication system, and the like are not limited.

A network architecture and a service scenario described in the embodiments of this disclosure are intended to describe the technical solutions in the embodiments of this disclosure more clearly, and do not constitute a limitation on the technical solutions provided in the embodiments of this disclosure. A person of ordinary skill in the art may learn that, with evolution of the network architecture and emergence of new service scenarios, the technical solutions provided in the embodiments of this disclosure are also applicable to similar technical problems.

Based on the communication system shown in FIG. 1, using an example in which the communication system shown in FIG. 1 is a TDD NB-IoT system, there are two formats for an NPUSCH in NB-IoT: an NPUSCH format 1 and an NPUSCH format 2. The NPUSCH format 1 is for transmitting uplink data, and the NPUSCH format 2 is for transmitting uplink control information. For example, the NPUSCH format 2 may be for transmitting an acknowledgment (ACK) or a negative acknowledgment (NACK) of downlink data. For the TDD NB-IoT system, the NPUSCH format 2 with the subcarrier spacing of 3.75 kHz supports only uplink/downlink configurations 1 and 4, as shown in Table 1. When the subcarrier spacing is 3.75 kHz, a slot is 2 ms and includes two consecutive subframes. For the uplink/downlink configurations 1 and 4 in Table 1, slot division may be shown in Table 2, where numbers {0, 1, 2, 3, 4} of slots in Table 2 are merely an example. An order for numbering the slots in Table 2 is not limited in this disclosure. For example, numbers of the slots in Table 2 from left to right may alternatively be {4, 3, 2, 1, 0}. It may be understood that, in Table 2, an uplink subframe is U for short, a downlink subframe is D for short, and a special subframe is S for short. When a slot includes two consecutive uplink subframes, the slot may be used for uplink signal transmission. Therefore, in Table 2, only a slot whose slot number is 1 may be used for the 3.75-kHz NPUSCH format 2, and other slots each include a downlink subframe and/or a special subframe and cannot be used for the 3.75-kHz NPUSCH format 2.

TABLE 2

| Uplink/<br>downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 1 | D | S | U | U | D | D | S | U | U | D |
| 4 | D | S | U | U | D | D | D | D | D | D |
| | $n_s = 0$ | | $n_s = 1$ | | $n_s = 2$ | | $n_s = 3$ | | $n_s = 4$ | |

It can be learned from the foregoing analysis that, based on the slot division in Table 2, only one slot can be used for the 3.75-kHz NPUSCH format 2.

Currently, a DMRS sequence of the NPUSCH format 2 is determined by using a slot number. Specifically, a DMRS sequence $r_u$ (n) is determined according to the following formula:

$$r_u(3n+m) = \overline{w}(m)\overline{r}_u(n), m = 0,1,2 \quad \text{(formula a)}$$

Formula a may be specifically expressed as the following three formulas:

$$r_u(3n+0) = \overline{w}(0)r_u(n);$$

$$r_u(3n+1) = \overline{w}(1)r_u(n); \text{ and}$$

$$r_u(3n+2) = \overline{w}(2)r_u(n).$$

It may be understood that three values are obtained by multiplying $r_u(n)$ by a spreading code $\overline{w}(m)$, and are mapped to three symbols in a slot (mapped to symbols 0, 1, and 2 for the 3.75-kHz NPUSCH format 2).

$$\bar{r}_u(n) = \frac{1}{\sqrt{2}}(1+j)(1-2c(n))w(n \bmod 16), 0 \le n < M_{rep}^{NPUSCH} N_{slots}^{UL} N_{RU},$$

$N_{RU}$ indicates a quantity of resource units (RU), $M_{rep}^{NPUSCH}$ indicates a quantity of repetitions of an NPUSCH, $N_{slots}^{UL}$ indicates a quantity of slots included in one RU, and u is a sequence group number. Because the NPUSCH format 2 does not support group hopping, $u=N_{ID}^{Ncell} \bmod 16$, where a value of u determines a value of a sequence [$\bar{w}(0)$, $\bar{w}(1)$, ..., $\bar{w}(15)$], as shown in Table 3. $N_{ID}^{Ncell}$ indicates a cell identifier (ID), c(n) is a pseudo-random sequence, and the generated c(n) is initialized according to $c_{init}$=35. Specifically, c(n) may be determined according to the following formula:

$$c(n)=x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

$N_c$=1600. An initial value of $x_1$ (n) satisfies that $x_1$ (0)=1, and $x_1$ (n)=0, where n=1, 2, . . . , 30. An initialization parameter of $x_2$ (n) is $c_{init}=\Sigma_{i=0}^{30} x_2(i) \cdot 2^i$.

TABLE 3

| u | [w(0), w(1), . . . , w(15)] |
|---|---|
| 0  | 1  1  1  1  1  1  1  1  1  1  1  1  1  1  1  1 |
| 1  | 1 -1  1 -1  1 -1  1 -1  1 -1  1 -1  1 -1  1 -1 |
| 2  | 1  1 -1 -1  1  1 -1 -1  1  1 -1 -1  1  1 -1 -1 |
| 3  | 1 -1 -1  1  1 -1 -1  1  1 -1 -1  1  1 -1 -1  1 |
| 4  | 1  1  1  1 -1 -1 -1 -1  1  1  1  1 -1 -1 -1 -1 |
| 5  | 1 -1  1 -1 -1  1 -1  1  1 -1  1 -1 -1  1 -1  1 |
| 6  | 1  1 -1 -1 -1 -1  1  1  1  1 -1 -1 -1 -1  1  1 |
| 7  | 1 -1 -1  1 -1  1  1 -1  1 -1 -1  1 -1  1  1 -1 |
| 8  | 1  1  1  1  1  1  1  1 -1 -1 -1 -1 -1 -1 -1 -1 |
| 9  | 1 -1  1 -1  1 -1  1 -1 -1  1 -1  1 -1  1 -1  1 |
| 10 | 1  1 -1 -1  1  1 -1 -1 -1 -1  1  1 -1 -1  1  1 |
| 11 | 1 -1 -1  1  1 -1 -1  1 -1  1  1 -1 -1  1  1 -1 |
| 12 | 1  1  1  1 -1 -1 -1 -1 -1 -1 -1 -1  1  1  1  1 |
| 13 | 1 -1  1 -1 -1  1 -1  1 -1  1 -1  1  1 -1  1 -1 |
| 14 | 1  1 -1 -1 -1 -1  1  1 -1 -1  1  1  1  1 -1 -1 |
| 15 | 1 -1 -1  1 -1  1  1 -1 -1  1  1 -1  1 -1 -1  1 |

In addition, a definition of $\bar{w}(m)$ is shown in Table 4. A sequence index (sequence index) may be determined according to the following formula:

sequence index=$(\Sigma_{i=0}^{7} c(8f(n_f)+i) \cdot 2^i) \bmod 3$, where $n_s$ is a slot number, and c(n) may be initialized by using the cell identifier $N_{ID}^{Ncell}$. As the slot number changes, a different $\bar{w}(m)$ may be used for each slot. In this way, inter-cell interference randomization can be implemented, improving performance of demodulating the NPUSCH format 2 by a base station.

TABLE 4

| Sequence index | [$\bar{w}(0)$ $\bar{w}(1)$ $\bar{w}(2)$] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

It can be learned from the foregoing analysis that, in a solution of determining a DMRS sequence for the NPUSCH format 2 by using a slot number, the sequence index may change among 0, 1, and 2 only when the slot number changes among a plurality of values. Further, the sequence [$\bar{w}(0)$ $\bar{w}(1)$ $\bar{w}(2)$] may change in the three sequences shown in Table 4, and the DMRS determined based on the changed sequence [$\bar{w}(0)$ $\bar{w}(1)$ $\bar{w}(2)$] can ensure inter-cell interference randomization.

Figure 2:
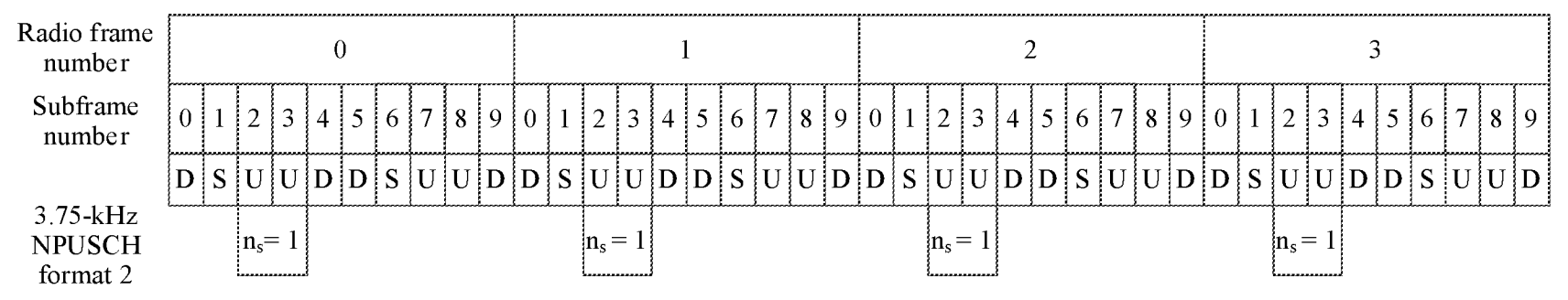

However, it can be learned from the foregoing content that, for the 3.75-kHz NPUSCH format 2 in the TDD NB-IoT system, only a specific slot may be used. In this case, a specific slot number is used each time to determine the sequence index. For example, as shown in FIG. 2, slot division in Table 2 is used as an example for the 3.75-kHz NPUSCH format 2. Four radio frames are used as an example in FIG. 2. Radio frame numbers of the radio frames are 0, 1, 2, and 3. For the 3.75-kHz NPUSCH format 2, $n_s$ used in any radio frame is always equal to 1. In this case, when the DMRS sequence for the 3.75-kHz NPUSCH format 2 is calculated or determined, determined sequence indexes are the same, and determined $\bar{w}(m)$ in all slots is the same (in a same cell). Consequently, inter-cell interference randomization cannot be implemented, affecting performance of demodulating the NPUSCH format 2 by the network device.

Based on the foregoing existing problems, the embodiments of this disclosure provide a communication method and an apparatus, to better implement inter-cell interference randomization. The method and the apparatus are based on a same inventive idea. Because problem-resolving principles of the method and the apparatus are similar, apparatus implementation and method implementation may be mutually referenced. Repeated parts are not described.

Figure 3:
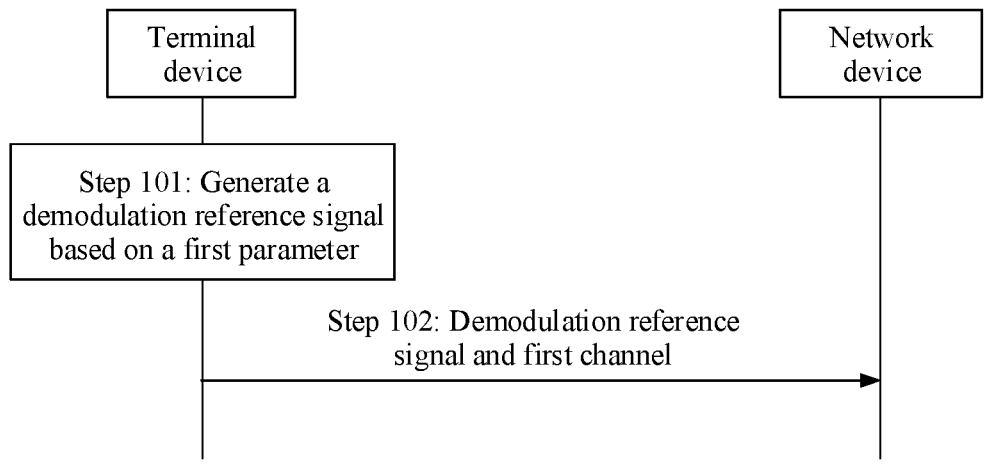
FIG. 3 is a flowchart of a communication method according to an embodiment of this disclosure.

Refer to FIG. 3. FIG. 3 is a flowchart of a communication method according to an embodiment of this disclosure. The method may be applied to the network architecture shown in FIG. 1, or certainly may be applied to another network architecture. This is not limited in this disclosure. When the method is applied to the network architecture shown in FIG. 1, a network device in the method may be the network device in FIG. 1, and a terminal device in the method may be the terminal device 1, the terminal device 3, the terminal device 5, or the like in FIG. 1. Refer to FIG. 3. The method may include the following processing procedure.

Step 101: The terminal device generates a demodulation reference signal based on a first parameter, where the first parameter includes a radio frame number of a radio frame for sending the demodulation reference signal.

Step 102: The terminal device sends the demodulation reference signal and a first channel to the network device, and correspondingly, the network device receives the demodulation reference signal and the first channel from the terminal device. The first channel is for carrying uplink control information, and the demodulation reference signal is a reference signal for demodulating the first channel. That the demodulation reference signal is a reference signal for demodulating the first channel may be understood as that the demodulation reference signal is for the first channel, may be understood as that the demodulation reference signal is for channel estimation of the first channel, may be understood as that the demodulation reference signal and the first channel are on a same time-domain resource but on different frequency-domain resources, or may be understood that the demodulation reference signal and the first channel are on a same frequency-domain resource but on different time-domain resources. According to the method shown in FIG. 3, the terminal device generates the demodulation reference signal based on the radio frame number. Because the radio frame number is time variant in a process in which the terminal device transmits the demodulation reference signal, the method can effectively implement inter-cell interference randomization, improving performance of demodulating the first channel by the network device.

In this embodiment of this disclosure, for the uplink/downlink configuration 1 in Table 1, another slot division manner is provided, as shown in Table 5. Numbers {0, 1, 2, 3} of slots in Table 5 are merely an example. An order for numbering the slots in Table 5 is not limited in this disclosure. For example, numbers of the slots in Table 5 from left to right may alternatively be {3, 2, 1, 0}. It should be noted that a slot number of a slot including a subframe 7 and a subframe 8 in Table 5 may be agreed to be another value, for example, 4, 5, or 6. It may be understood that, in Table 5, an uplink subframe is U for short, a downlink subframe is D for short, and a special subframe is S for short. Slots whose slot numbers are 1 and 3 in Table 5 may be used for a 3.75-kHz NPUSCH format 2. Other slots each include a downlink subframe and/or a special subframe, and cannot be used for the 3.75-kHz NPUSCH format 2.

TABLE 5

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 1 | D | S | U $n_s=0$ | U $n_s=1$ | D | D | S | U $n_s=2$ | U $n_s=3$ | D |

It should be noted that the method provided in this embodiment of this disclosure may not only be applied to the slot division scenario in Table 2, but also may be applied to the slot division scenario shown in Table 5 provided in this disclosure.

In this embodiment of this disclosure, the first channel may be a physical uplink shared channel, a format of the physical uplink shared channel may be a format 2, and a subcarrier spacing of the first channel may be 3.75 kHz. The first channel may support an uplink/downlink configuration 1 and/or an uplink/downlink configuration 4 in TDD, and the first channel may be transmitted by using two consecutive uplink subframes in a radio frame. For example, the first channel may be a PUSCH, and is an NPUSCH in an NB-IoT system. A format of the NPUSCH may be a format 2, and a subcarrier spacing of the NPUSCH may be 3.75 kHz. The NPUSCH format 2 with the subcarrier spacing of 3.75 kHz may support uplink/downlink configurations 1 and 4 in TDD. When the uplink/downlink configuration 1 in TDD is supported, the NPUSCH format 2 may be transmitted by using uplink subframes 2 and 3 in a radio frame and/or uplink subframes 7 and 8 in the radio frame. When the uplink/downlink configuration 4 in TDD is supported, the NPUSCH format 2 may be transmitted by using uplink subframes 2 and 3 in the radio frame. It should be understood that the first channel may alternatively be a physical uplink control channel (PUCCH).

In a possible example, the generating, by the terminal device, a demodulation reference signal based on a first parameter includes: The terminal device generates a first sequence based on the radio frame number, and generates the demodulation reference signal based on the first sequence. In this disclosure, the first sequence may be a spreading sequence. For example, the first sequence may be expressed as $[\overline{w}(0), \overline{w}(1), \overline{w}(2)]$. It should be noted that a letter w in $[\overline{w}(0), \overline{w}(1), \overline{w}(2)]$ has no special meaning, and "-" above the letter w has no meaning. Another letter may alternatively be for expressing the sequence. For example, the first sequence may be expressed as $[k(0), k(1), k(2)]$.

Based on the foregoing example, in a first possible implementation, the generating, by the terminal device, a first sequence based on the radio frame number includes: The terminal device determines a sequence index based on the radio frame number and a pseudo-random sequence, and determines the first sequence based on the sequence index. For example, the terminal device may determine the sequence index based on the radio frame number and the pseudo-random sequence, and may further determine the first sequence based on the sequence index and a preset correspondence. The preset correspondence includes a one-to-one correspondence between a plurality of sequence indexes and a plurality of sequences. The plurality of sequence indexes include the sequence index, and the plurality of sequences include the first sequence.

In this embodiment of this disclosure, the pseudo-random sequence may be a binary sequence. For example, the pseudo-random sequence may be c(n). The pseudo-random sequence may be initialized by using at least one of a cell identifier $N_{ID}^{cell}$, a radio frame number $n_f$, and a slot number $n_s$. For example, when the pseudo-random sequence is initialized by using $N_{ID}^{Ncell}$, the initialized pseudo-random sequence $c_{init}$ may be equal to $N_{ID}^{Ncell}$. For another example, when the pseudo-random sequence is initialized by using $N_{ID}^{Ncell}$ and $n_f$, the initialized pseudo-random sequence $c_{init}$ may be $c_{init}$=cell ID+$2^9(n_f \mod X)$, where X is an integer greater than 1. For another example, when the pseudo-random sequence is initialized by using $N_{ID}^{Ncell}$, $n_f$, and $n_s$, the initialized pseudo-random sequence $c_{init}$ may be $$c_{init} = \text{cell } ID + 2^9((10n_f + \left\lfloor \frac{n_s}{2} \right\rfloor) \mod Z),$$

where Z is an integer greater than 1.

Based on the foregoing example, in a second possible implementation, the generating, by the terminal device, the demodulation reference signal based on the first sequence includes: The terminal device generates a second sequence based on a cell identifier, and may further generate a sequence of the demodulation reference signal based on the first sequence and the second sequence, and map the sequence of the demodulation reference signal to a time-frequency resource. The time-frequency resource is for sending the demodulation reference signal. For example, the first sequence may be expressed as $[\overline{w}(0), \overline{w}(1), \overline{w}(2)]$, and the second sequence may be expressed as $[\overline{r}_u(0), \overline{r}_u(1), \ldots, \overline{r}_u(K-1)]$. Correspondingly, the sequence of the demodulation reference signal may be expressed as $r_u(3n+m) = \overline{w}(m)\overline{r}_u(n)$, K is a length of the second sequence, $u = N_{ID}^{cell} \mod 16$, $N_{ID}^{cell}$ is the cell identifier, a value of m is $\{0, 1, 2\}$, a value of n is $\{0, 1, 2, \ldots, K-1\}$, and K may be $M_{rep}^{NPUSCH} N_{slots}^{UL} N_{RU}$. For meanings of parameters in $M_{rep}^{NPUSCH} N_{slots}^{UL} N_{RU}$, refer to the foregoing descriptions.

Based on the first possible implementation, in a possible design, the determining a sequence index based on the radio frame number and a pseudo-random sequence includes: determining the sequence index according to a formula $(\Sigma_{i=0}^{7} c(8f(n_f)+i) \cdot 2^i) \mod 3$, where c(n) is the pseudo-random sequence, $n_f$ is the radio frame number, $\Sigma$ is a summation operation, mod is a modulo operation, and $f(n_f)$ is determined based on the radio frame number.

In this embodiment of this disclosure, how the terminal device determines $f(n_f)$ based on the radio frame number is not limited. For example, the terminal device may determine $f(n_f)$ according to any one of the following formulas:

Formula 1: $f(n_f) = n_f$. The terminal device may determine the sequence index according to the formula and based on $n_f$ of the radio frame for sending the demodulation reference signal. Because $n_f$ is time variant, different sequence indexes may be determined in different slots. Further, different first sequences may be determined in the different slots based on the different sequence indexes. In this way, inter-cell interference randomization can be implemented, improving performance of demodulating the first channel by the network device.

Formula 2: $f(n_f) = n_f \mod X$, where X is an integer greater than 1. For example, a value of X may be 3 or 5, and certainly, may alternatively be another integer greater than 1. The sequence index may still be determined according to the formula and based on $n_f$ of the radio frame for sending the demodulation reference signal, to achieve a same objective as formula 1, that is, inter-cell interference randomization can be implemented, improving performance of demodulating the first channel by the network device. In addition, because a modulo operation is performed on $n_f$ in formula 2, $f(n_f)$ with a smaller value can be obtained. For example, a maximum value of $8n_f+i$ in $c(8n_f+i)$ may be 8191 according to formula 1, and a maximum value of $8 \cdot (n_f \mod X)+i$ in $c(8 \cdot (n_f \mod X)+i)$ may be 39 according to formula 2. Compared with formula 1, formula 2 can further reduce an operation amount of the terminal device, and improve processing efficiency of the terminal device.

Formula 3: $f(n_f) = 5n_f + n_s$, where $n_s$ in each of formula 3 to formula 6 is a slot number of a slot for sending the demodulation reference signal. Although the sequence index continues to be determined by using $n_s$ in formula 3, the sequence index is also determined based on $n_f$ of the radio frame for sending the demodulation reference signal. Because $n_f$ is time variant, $5n_f+n_s$ is also time variant. In this way, formula 3 can achieve the same objective as formula 1, that is, can implement inter-cell interference randomization, improving performance of demodulating the first channel by the network device.

Formula 4: $f(n_f) = (5n_f+n_s) \mod Z$, where Z is an integer greater than 1. For example, Z may be 3 or 5. Formula 4 may be understood as an improvement based on formula 3, and can achieve the same objective as formula 3, that is, can implement inter-cell interference randomization, improving performance of demodulating the first channel by the network device. In addition, because a modulo operation is performed on $5n_f+n_s$ in formula 4, $f(n_f)$ with a smaller value can be obtained. Compared with formula 3, formula 4 can further reduce an operation amount of the terminal device, and improve processing efficiency of the terminal device.

$$f(n_f) = 10n_f + \left\lfloor \frac{n_s}{2} \right\rfloor, \qquad \text{Formula 5}$$

where $\lfloor\ \rfloor$ in each of formula 5 and formula 6 is a round-down operation. Although the sequence index continues to be determined by using $n_s$ in formula 5, the sequence index is also determined based on $n_f$ of the radio frame for sending the demodulation reference signal. Because $n_f$ is time variant, $$10n_f + \left\lfloor \frac{n_s}{2} \right\rfloor$$

is also time variant. In this way, formula 5 can achieve the same objective as formula 1, that is, can implement inter-cell interference randomization, improving performance of demodulating the first channel by the network device.

$$f(n_f) = \left(10n_f + \left\lfloor \frac{n_s}{2} \right\rfloor\right) \mod Z, \qquad \text{Formula 6}$$

where Z is an integer greater than 1. For example, Z may be 3 or 5. Formula 6 may be understood as an improvement based on formula 5, and can achieve the same objective as formula 5, that is, can implement inter-cell interference randomization, improving performance of demodulating the first channel by the network device. In addition, because a modulo operation is performed on $$10n_f + \left\lfloor \frac{n_s}{2} \right\rfloor$$

in formula 6, $f(n_f)$ with a smaller value can be obtained. Compared with formula 5, formula 6 can further reduce an operation amount of the terminal device, and improve processing efficiency of the terminal device.

Based on the first possible implementation, in another possible design, the determining a sequence index based on the radio frame number and a pseudo-random sequence includes: determining the sequence index according to a formula $(\Sigma_{i=0}^{7} c(8f(n_f)+i) \cdot 2^i) \mod 3$, where c(n) is the pseudo-random sequence, $\Sigma$ is a summation operation, mod is a modulo operation, and $n_s'$ is a slot number in a transmission resource for the first channel, that is, may be understood as a relative value of the slot number. For example, if the current resource for the first channel includes a total of 16 slots, a value of $n_s'$ may be 0 to 15. According to the method, the terminal device may determine the sequence index based on the slot number in the transmission resource for the first channel. Because the slot number in the transmission resource for the first channel is time variant, different sequence indexes may be determined in different slots. Further, different first sequences may be determined in the different slots based on the different sequence indexes. In this way, inter-cell interference randomization can be implemented, improving performance of demodulating the first channel by the network device.

The following uses specific examples to describe the foregoing method provided in this disclosure.

In an example 1, the first channel is an NPUSCH, a format of the first channel is a format 2, a subcarrier spacing of the first channel is 3.75 kHz, the first channel supports the uplink/downlink configuration 1 and/or the uplink/downlink configuration 4 in TDD, and the first channel is transmitted by using the uplink subframes 2 and 3 in the radio frame.

In the example 1, the terminal device may determine the sequence index according to any one of the following formulas:

$$\left(\sum_{i=0}^{7} c(8n_f + i) \cdot 2^i\right) \bmod 3,$$

$$\left(\sum_{i=0}^{7} c(8(n_f \bmod X) + i) \cdot 2^i\right) \bmod 3,$$

$$\left(\sum_{i=0}^{7} c(8(5n_f + n_s) + i) \cdot 2^i\right) \bmod 3,$$

$$\left(\sum_{i=0}^{7} c(8((5n_f + n_s) \bmod Z) + i) \cdot 2^i\right) \bmod 3,$$

$$\left(\sum_{i=0}^{7} c(8(10n_f + \lfloor \tfrac{n_s}{2} \rfloor) + i) \cdot 2^i\right) \bmod 3, \text{ and}$$

$$\left(\sum_{i=0}^{7} c(8((10n_f + \lfloor \tfrac{n_s}{2} \rfloor) \bmod Z) + i) \cdot 2^i\right) \bmod 3.$$

Meanings of parameters and sequences in any one of the foregoing formulas are the same as meanings in formulas 1 to 6, and details are not described herein again.

After determining the sequence index according to any one of the foregoing formulas, the terminal device may determine, based on the determined sequence index and a correspondence between a sequence index and a sequence [$\bar{w}(0) \, \bar{w}(1) \, \bar{w}(2)$] in Table 4, a sequence [$\bar{w}(0) \, \bar{w}(1) \, \bar{w}(2)$] corresponding to the determined sequence index, to obtain the sequence of the demodulation reference signal through calculation according to formula a. In this case, the terminal device may map the sequence of the demodulation reference signal to the time-frequency resource, and may send the demodulation reference signal to the network device on the time-frequency resource.

It may be understood that the sequence index is determined based on the radio frame number $n_f$ in any one of the foregoing formulas. Because the radio frame number is time variant, the terminal device may determine the sequence index within a period of time by using a changed radio frame number. In this case, the determined sequence index is also time variant. It can be learned from Table 4 that when the sequence index changes, a corresponding sequence [$\bar{w}(0) \, \bar{w}(1) \, \bar{w}(2)$] also changes, so that the terminal device can determine the sequence of the demodulation reference signal based on the changed sequence [$\bar{w}(0) \, \bar{w}(1) \, \bar{w}(2)$]. In this way, the method can implement inter-cell interference randomization, improving performance of demodulating the first channel by the network device.

In an example 2, the first channel is an NPUSCH, a format of the first channel is a format 2, a subcarrier spacing of the first channel is 3.75 kHz, the first channel supports the uplink/downlink configuration 1 in TDD, and the first channel is transmitted by using the uplink subframes 2 and 3 and the uplink subframes 7 and 8 in the radio frame. It should be noted that, in the example 2, the terminal device may transmit the NPUSCH format 2 by using two slots included in one radio frame.

In the example 2, the terminal device may determine the sequence index according to any one of the following formulas:

$$\left(\sum_{i=0}^{7} c(8n_s + i) \cdot 2^i\right) \bmod 3,$$

$$\left(\sum_{i=0}^{7} c(8(n_f \bmod X) + i) \cdot 2^i\right) \bmod 3,$$

$$\left(\sum_{i=0}^{7} c(8(5n_f + n_s) + i) \cdot 2^i\right) \bmod 3,$$

$$\left(\sum_{i=0}^{7} c(8((5n_f + n_s) \bmod Z) + i) \cdot 2^i\right) \bmod 3,$$

$$\left(\sum_{i=0}^{7} c(8(10n_f + \lfloor \tfrac{n_s}{2} \rfloor) + i) \cdot 2^i\right) \bmod 3, \text{ and}$$

$$\left(\sum_{i=0}^{7} c(8((10n_f + \lfloor \tfrac{n_s}{2} \rfloor) \bmod Z) + i) \cdot 2^i\right) \bmod 3.$$

Meanings of parameters and sequences in any one of the foregoing formulas are the same as meanings in formulas 1 to 6, and details are not described herein again.

After determining the sequence index according to any one of the foregoing formulas, the terminal device may determine, based on the determined sequence index and a correspondence between a sequence index and a sequence [$\bar{w}(0) \, \bar{w}(1) \, \bar{w}(2)$] in Table 4, a sequence [$\bar{w}(0) \, \bar{w}(1) \, \bar{w}(2)$] corresponding to the determined sequence index, to obtain the sequence of the demodulation reference signal through calculation according to formula a. In this case, the terminal device may map the sequence of the demodulation reference signal to the time-frequency resource, and may send the demodulation reference signal to the network device on the time-frequency resource.

It may be understood that the sequence index is determined based on the slot number $n_s$ and/or the radio frame number $n_f$ in the foregoing formulas. Because the slot number and the radio frame number in the example 2 are both time variant, the terminal device may determine the sequence index within a period of time by using a changed slot number and/or radio frame number. In this case, the determined sequence index is also time variant. It can be learned from Table 4 that when the sequence index changes, a corresponding sequence [$\bar{w}(0) \, \bar{w}(1) \, \bar{w}(2)$] also changes, so that the terminal device can determine the sequence of the demodulation reference signal based on the changed sequence [$\bar{w}(0) \, \bar{w}(1) \, \bar{w}(2)$]. In this way, the method can implement inter-cell interference randomization, improving performance of demodulating the first channel by the network device.

Figure 4:
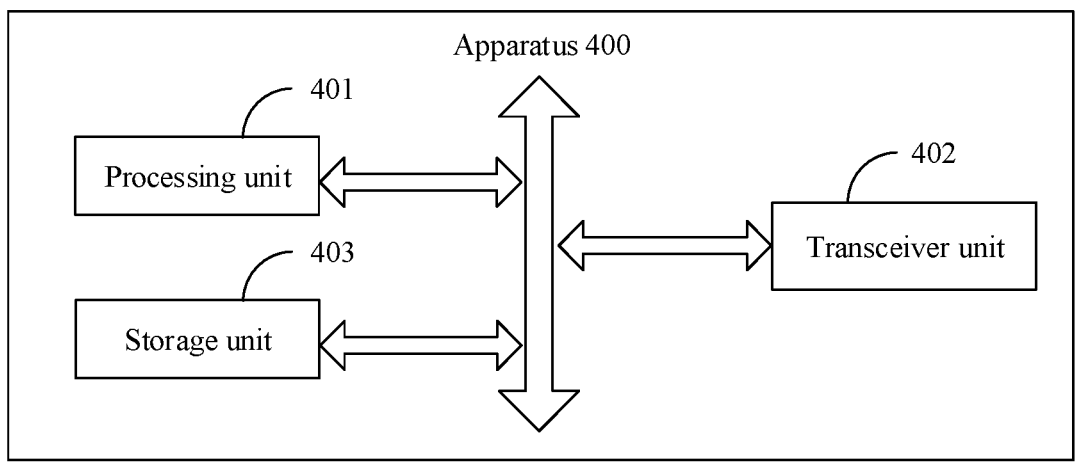
FIG. 4 is a schematic diagram of a structure of an apparatus according to an embodiment of this disclosure.

Based on a same invention idea, an embodiment of this disclosure further provides an apparatus. The apparatus may be of a structure shown in FIG. 4. The apparatus may be a terminal device, or may be a chip or a chip system capable of supporting the terminal device to implement the foregoing method. When the apparatus is a terminal device, the apparatus has behavioral functions of the terminal device in the foregoing method embodiment. As shown in FIG. 4, the apparatus 400 may include a processing unit 401 and a transceiver unit 402. The processing unit 401 may be configured to generate a demodulation reference signal based on a first parameter. The first parameter includes a radio frame number of a radio frame for sending the demodulation reference signal. The transceiver unit 402 may be configured to send the demodulation reference signal and a first channel. The first channel is for carrying uplink control information, and the demodulation reference signal is a reference signal for demodulating the first channel. During implementation, the apparatus 400 may further include a storage unit 403. The storage unit 403 may be coupled to the processing unit 401, to store a program and instructions that are required by the processing unit 401 to perform functions.

In a possible design, the processing unit 401 is specifically configured to: generate a first sequence based on the radio frame number, and generate the demodulation reference signal based on the first sequence.

In a possible design, the processing unit 401 is specifically configured to: determine a sequence index based on the radio frame number and a pseudo-random sequence, and determine the first sequence based on the sequence index.

In a possible design, the processing unit 401 is specifically configured to: determine the sequence index according to a formula $(\Sigma_{i=0}^{7} c(8f(n_f)+i) \cdot 2^i) \bmod 3$, where $c(n)$ is the pseudo-random sequence, $n_f$ is the radio frame number, $\Sigma$ is a summation operation, mod is a modulo operation, and $f(n_s)$ is determined based on the radio frame number.

In a possible design, $f(n_f)$ satisfies the following formula:

$$f(n_f) = n_f,$$
$$f(n_f) = n_f \bmod X,$$
$$f(n_f) = 5n_f + n_s,$$
$$f(n_f) = (5n_f + n_s) \bmod Z,$$
$$f(n_f) = 10n_f + \left\lfloor \frac{n_s}{2} \right\rfloor, \text{ or}$$
$$f(n_f) = \left(10n_f + \left\lfloor \frac{n_s}{2} \right\rfloor\right) \bmod Z,$$

where $n_s$ is a slot number of a slot for sending the demodulation reference signal, $\lfloor \: \rfloor$ is a round-down operation, X is an integer greater than 1, and Z is an integer greater than 1.

In a possible design, the processing unit 401 is specifically configured to: generate a second sequence based on a cell identifier, generate a sequence of the demodulation reference signal based on the first sequence and the second sequence, and map the sequence of the demodulation reference signal to a time-frequency resource. The time-frequency resource is for sending the demodulation reference signal.

In a possible design, the first sequence is $[\overline{w}(0), \overline{w}(1), \overline{w}(2)]$, the second sequence is $[\overline{r}_u(0), \overline{r}_u(1), \ldots, \overline{r}_u(K-1)]$, and the sequence of the demodulation reference signal is $r_u(3n+m) = \overline{w}(m)\overline{r}_u(n)$, where K is a length of the second sequence, $u = N_{ID}^{cell} \bmod 16$, $N_{ID}^{cell}$ is the cell identifier, a value of m is $\{0, 1, 2\}$, and a value of n is $\{0, 1, 2, \ldots, K-1\}$.

In a possible design, the first channel is a physical uplink shared channel, and a format of the physical uplink shared channel is a format 2.

In a possible design, a subcarrier spacing of the first channel is 3.75 kHz, and the first channel supports an uplink/downlink configuration 1 and/or an uplink/downlink configuration 4 in time division duplex (TDD).

In a possible design, the first channel is transmitted by using two consecutive uplink subframes of a radio frame.

Figure 5:
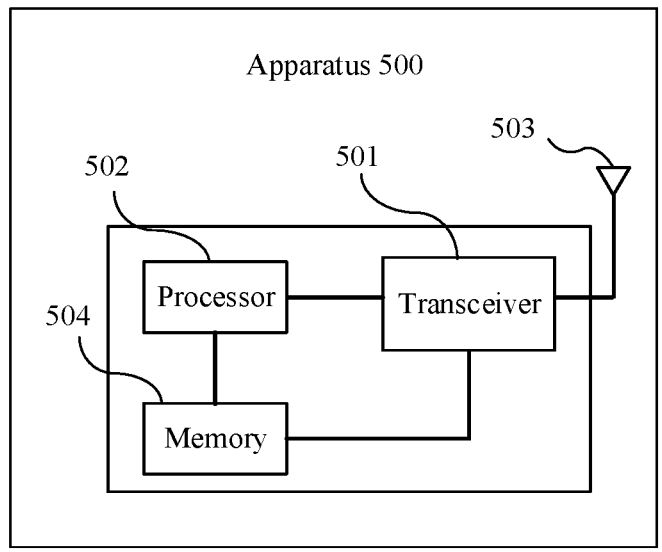
FIG. 5 is a schematic diagram of a structure of another apparatus according to an embodiment of this disclosure.

In addition, an embodiment of this disclosure further provides an apparatus. The apparatus may be of a structure shown in FIG. 5. The apparatus may be a terminal device, or may be a chip or a chip system capable of supporting the terminal device to implement the foregoing method. The apparatus 500 shown in FIG. 5 may include at least one processor 502. The at least one processor 502 is configured to: be coupled to a memory, and read and execute instructions in the memory, to implement the step performed by the terminal device in the method provided in the foregoing embodiment of this disclosure. Optionally, the apparatus 500 may further include a transceiver 501 configured to support the apparatus 500 to receive or send signaling or data. The transceiver 501 of the apparatus 500 may be configured to implement the functions of the transceiver unit 402. For example, the transceiver 501 may be used by the apparatus 500 to perform step 102 in the communication method shown in FIG. 3. The processor 502 may be configured to implement the functions of the processing unit 401. For example, the processor 502 may be used by the apparatus 500 to perform step 101 in the communication method shown in FIG. 3. In addition, the transceiver 501 may be coupled to an antenna 503, to support the apparatus 500 in communication. Optionally, the apparatus 500 may further include a memory 504. The memory 504 stores a computer program and instructions. The memory 504 may be coupled to the processor 502 and/or the transceiver 501, to support the processor 502 to invoke the computer program and instructions in the memory 504 to implement the step performed by the terminal device in the method provided in the foregoing embodiment of this disclosure. In addition, the memory 504 may be further configured to store data in the foregoing method embodiment of this disclosure. For example, the memory 504 is configured to store data and instructions that are required for supporting the transceiver 501 in interaction, and/or configured to store configuration information required for the apparatus 500 to perform the method in the foregoing embodiment of this disclosure.

Figure 6:
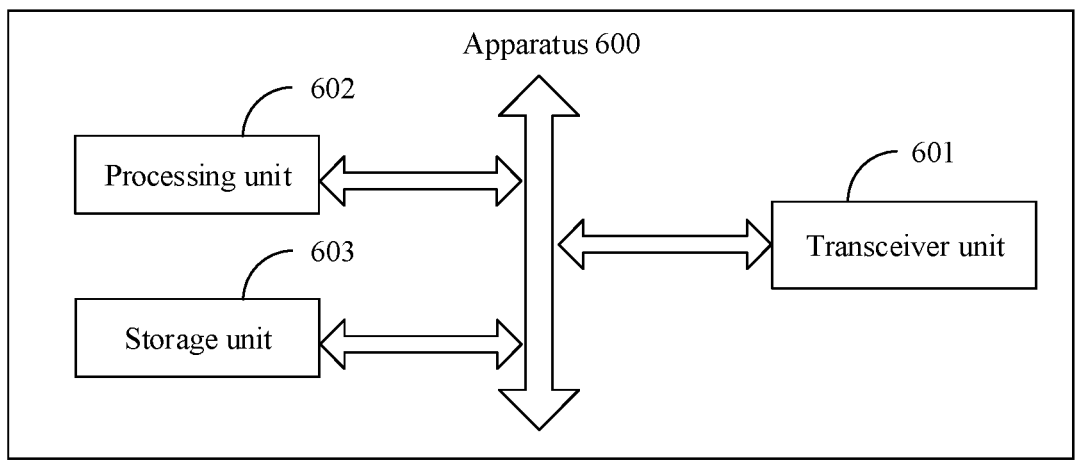
FIG. 6 is a schematic diagram of a structure of still another apparatus according to an embodiment of this disclosure.

Based on a same invention idea, an embodiment of this disclosure provides another apparatus. The apparatus may be of a structure shown in FIG. 6. The apparatus may be a network device, or may be a chip or a chip system capable of supporting the network device to implement the foregoing method. When the apparatus is a network device, the apparatus has behavioral functions of the network device in the foregoing method embodiment. As shown in FIG. 6, the apparatus 600 may include a transceiver unit 601. The transceiver unit 601 may be configured to receive a demodulation reference signal. The demodulation reference signal is generated based on a first parameter. The first parameter includes a radio frame number of a radio frame for sending the demodulation reference signal. The transceiver unit 601 may be further configured to receive a first channel. The first channel is for carrying uplink control information, and the demodulation reference signal is a reference signal for demodulating the first channel. During implementation, the apparatus 600 may further include a processing unit 602 and a storage unit 603. The storage unit 603 is configured to store a program and instructions that are required by the apparatus to perform functions.

In a possible design, the demodulation reference signal is generated based on a first sequence, and the first sequence is generated based on the radio frame number.

In a possible design, the first sequence is determined based on a sequence index, and the sequence index is determined based on the radio frame number and a pseudo-random sequence.

In a possible design, the sequence index is determined according to a formula $(\Sigma_{i=0}^{7} c(8f(n_f)+i) \cdot 2^i) \bmod 3$, where $c(n)$ is the pseudo-random sequence, $n_f$ is the radio frame number, $\Sigma$ is a summation operation, mod is a modulo operation, and $f(n_f)$ is determined based on the radio frame number.

In a possible design, $f(n_f)$ satisfies the following formula:

$$f(n_f) = n_f,$$
$$f(n_f) = n_f \bmod X,$$

-continued $$f(n_f) = 5n_f + n_s,$$

$$f(n_f) = (5n_f + n_s) \bmod Z,$$

$$f(n_f) = 10n_f + \left\lfloor \frac{n_s}{2} \right\rfloor, \text{ or}$$

$$f(n_f) = \left(10n_f + \left\lfloor \frac{n_s}{2} \right\rfloor\right) \bmod Z,$$

where $n_s$ is a slot number of a slot for sending the demodulation reference signal, $\lfloor \rfloor$ is a round-down operation, X is an integer greater than 1, and Z is an integer greater than 1.

In a possible design, a sequence of the demodulation reference signal is generated based on the first sequence and a second sequence, the second sequence is generated based on a cell identifier, and the sequence of the demodulation reference signal is mapped to a time-frequency resource. The time-frequency resource is for sending the demodulation reference signal.

In a possible design, the first sequence is $[\overline{w}(0), \overline{w}(1), \overline{w}(2)]$, the second sequence is $[\overline{r}_u(0), \overline{r}_u(1), \ldots, \overline{r}_u(K-1)]$, and the sequence of the demodulation reference signal is $r_u(3n+m) = \overline{w}(m)\overline{r}_u(n)$, where K is a length of the second sequence, u=No mod 16, Ncell is the cell identifier, a value of m is $\{0, 1, 2\}$, and a value of n is $\{0, 1, 2, \ldots, K-1\}$.

In a possible design, the first channel is a physical uplink shared channel, and a format of the physical uplink shared channel is a format 2.

In a possible design, a subcarrier spacing of the first channel is 3.75 kHz, and the first channel supports an uplink/downlink configuration 1 and/or an uplink/downlink configuration 4 in time division duplex (TDD).

In a possible design, the first channel is transmitted by using two consecutive uplink subframes of a radio frame.

Figure 7:
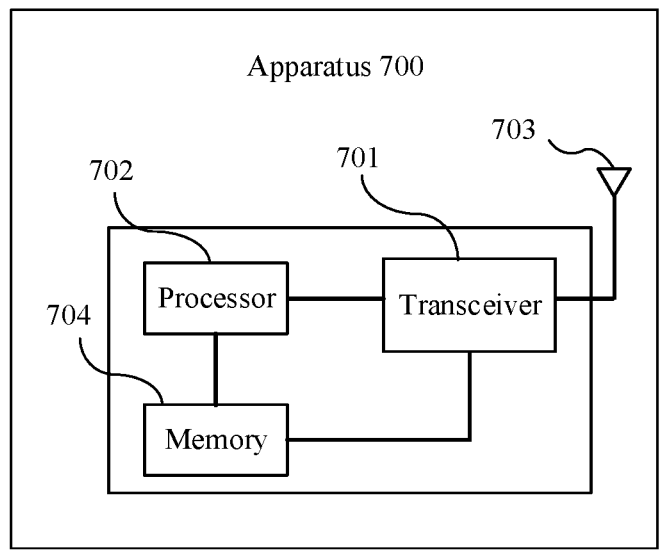
FIG. 7 is a schematic diagram of a structure of yet another apparatus according to an embodiment of this disclosure.

In addition, an embodiment of this disclosure further provides an apparatus. The apparatus may be of a structure shown in FIG. 7. The apparatus may be a network device, or may be a chip or a chip system capable of supporting the network device to implement the foregoing method. For example, the network device may be a base station. The apparatus 700 shown in FIG. 7 may include at least one processor 702. The at least one processor 702 is configured to: be coupled to a memory, and read and execute instructions in the memory, to implement the step performed by the network device in the method provided in the foregoing embodiment of this disclosure. Optionally, the apparatus 700 may further include a transceiver 701 configured to support the apparatus 700 to receive or send signaling or data. The transceiver 701 of the apparatus 700 may be configured to implement the functions of the transceiver unit 601. For example, the transceiver 701 may be used by the apparatus 700 to perform step 102 in the communication method shown in FIG. 3. In addition, the transceiver 701 may be coupled to an antenna 703, to support the apparatus 700 in communication. Optionally, the apparatus 700 may further include a memory 704. The memory 704 stores a computer program and instructions. The memory 704 may be coupled to the processor 702 and/or the transceiver 701, to support the processor 702 to invoke the computer program and the instructions in the memory 704 to implement the step performed by the network device in the method provided in the foregoing embodiment of this disclosure. In addition, the memory 704 may be further configured to store data in the foregoing method embodiment of this disclosure. For example, the memory 704 is configured to store data and instructions that are required for supporting the transceiver 701 in interaction, and/or configured to store configuration information required for the apparatus 700 to perform the method in the foregoing embodiment of this disclosure.

Based on a same idea as the foregoing method embodiment, an embodiment of this disclosure further provides a computer-readable storage medium. The computer-readable storage medium stores some instructions. When these instructions are invoked and executed by a computer, the computer may be enabled to complete the method in any one of the foregoing method embodiment or the possible designs of the foregoing method embodiment. The computer-readable storage medium is not limited in this embodiment of this disclosure. For example, the computer-readable storage medium may be a RAM (random-access memory) or a ROM (read-only memory).

Based on a same idea as the foregoing method embodiment, this disclosure further provides a computer program product. When being invoked and executed by a computer, the computer program product can complete the method in any one of the foregoing method embodiment and the possible designs of the foregoing method embodiment.

Based on a same idea as the foregoing method embodiment, this disclosure further provides a chip. The chip may include a processor and an interface circuit, to complete the method in any one of the foregoing method embodiment and the possible implementations of the foregoing method embodiment. "Couple" means that two components are directly or indirectly combined with each other. The combination may be fixed or movable, and the combination may allow communication of fluid, electricity, an electrical signal, or another type of signal between two components.

All or some of the foregoing embodiments may be implemented by using software, hardware, firmware, or any combination thereof. When software is for implementing the embodiments, all or some of the embodiments may be implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this disclosure may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this disclosure may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto a computer or another programmable data processing device, so that a series of operation steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although the present invention is described with reference to specific features and the embodiments thereof, it is clear that various modifications and combinations may be made to them without departing from the scope of the present invention. Correspondingly, the specification and the accompanying drawings are merely examples of the present invention defined by the appended claims, and are considered as any of or all modifications, variations, combinations or equivalents that cover the scope of the present invention. It is clear that a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A communication method, comprising:
    generating a demodulation reference signal based on a first parameter, wherein the demodulation reference signal is a reference signal for demodulating a first channel, the first channel is for carrying uplink control information, and the first parameter comprises a radio frame number of a radio frame for sending the demodulation reference signal; and
    sending the demodulation reference signal and the first channel,
    wherein the generating the demodulation reference signal based on the first parameter comprises:
    generating a first sequence based on the radio frame number;
    generating a second sequence based on a cell identifier;
    generating a sequence of the demodulation reference signal based on the first sequence and the second sequence; and
    mapping the sequence of the demodulation reference signal to a time-frequency resource, wherein the time-frequency resource is for sending the demodulation reference signal; and
    wherein the first sequence is $[\bar{w}(0), \bar{w}(1), \bar{w}(2)]$, the second sequence is $[\bar{r}_u(0), \bar{r}_u(1), \ldots, (K-1)\bar{r}_u(0), r_u(1) \ldots \bar{r}_u(K-1)]$, and the sequence of the demodulation reference signal is $r_u(3n+m)=\bar{w}(m)\bar{r}_u(n)$, wherein K is a length of the second sequence, $u=N_{ID}^{cell} \mod 16$, $N_{ID}^{cell}$ is the cell identifier, a value of m is $\{0, 1, 2\}$, and a value of n is $\{0, 1, 2, \ldots, K-1\}$.

2. The method according to claim 1, wherein the generating the first sequence based on the radio frame number comprises:
    determining a sequence index based on the radio frame number and a pseudo-random sequence; and
    determining the first sequence based on the sequence index.

3. The method according to claim 2, wherein the determining the sequence index based on the radio frame number and the pseudo-random sequence comprises:
    determining the sequence index according to a formula $(\Sigma_{i=0}^{7} c(8f(n_f)+i)\cdot 2^i) \mod 3$ wherein $c(n)$ is the pseudo-random sequence, $n_f$ is the radio frame number, $\Sigma$ is a summation operation, mod is a modulo operation, and $f(n_f)$ is determined based on the radio frame number.

4. The method according to claim 1, wherein the first channel is a physical uplink shared channel, and a format of the physical uplink shared channel is a format 2.

5. The method according to claim 1, wherein a subcarrier spacing of the first channel is 3.75 kHz, and the first channel supports an uplink/downlink configuration 1 and/or an uplink/downlink configuration 4 in time division duplex.

6. The method according to claim 1, wherein the first channel is transmitted by using two consecutive uplink subframes of a radio frame.

7. A communication method, comprising:
    receiving a demodulation reference signal and a first channel, wherein the demodulation reference signal is a reference signal for demodulating the first channel, the first channel is for carrying uplink control, the demodulation reference signal is further generated based on a first parameter, and the first parameter comprises a radio frame number of a radio frame for sending the demodulation reference signal; and
    demodulating the first channel based on the demodulation reference signal,
    wherein the demodulation reference signal is generated based on a first sequence and a second sequence, and the first sequence is generated based on the radio frame number,
    wherein the second sequence is generated based on a cell identifier, and the sequence of the demodulation reference signal is mapped to a time-frequency resource, wherein the time-frequency resource is for sending the demodulation reference signal, and
    wherein the first sequence is $[\bar{w}(0), \bar{w}(1), \bar{w}(2)]$, the second sequence is $[\bar{r}_u(0), \bar{r}_u(1), \ldots, \bar{r}_u(K-1)\bar{r}_u(0), \bar{r}_u(1) \ldots \bar{r}_u(K-1)]$, and the sequence of the demodulation reference signal is $r_u(3n+m)=\bar{w}(m)\bar{r}_u(n)$, wherein K is a length of the second sequence, $u=N_{ID}^{cell} \mod 16$, $N_{ID}^{cell}$ is the cell identifier, a value of m is {0, 1, 2}, and a value of n is {0, 1, 2, ..., K−1}.

8. The method according to claim 7, wherein the first sequence is determined based on a sequence index, and the sequence index is determined based on the radio frame number and a pseudo-random sequence.

9. The method according to claim 8, wherein the sequence index is determined according to a formula $(\Sigma_{i=0}^{7} c(8f(n_f)+i) \cdot 2^i)$ mod 3, wherein c(n) is the pseudo-random sequence, $n_f$ is the radio frame number, $\Sigma$ is a summation operation, mod is a modulo operation, and $f(n_f)$ is determined based on the radio frame number.

10. The method according to claim 7, wherein the first channel is a physical uplink shared channel, and a format of the physical uplink shared channel is a format 2.

11. The method according to claim 7, wherein a subcarrier spacing of the first channel is 3.75 kHz, and the first channel supports an uplink/downlink configuration 1 and/or an uplink/downlink configuration 4 in time division duplex.

12. The method according to claim 7, wherein the first channel is transmitted by using two consecutive uplink subframes of a radio frame.

13. A communication system, comprising a terminal device and a network device, wherein:
the terminal device is configured to:
generate a demodulation reference signal based on a first parameter, wherein the demodulation reference signal is a reference signal for demodulating a first channel, the first channel is for carrying uplink control information, and the first parameter comprises a radio frame number of a radio frame for sending the demodulation reference signal; and
send the demodulation reference signal and the first channel to the network device;
and
the network device is configured to:
receive the demodulation reference signal and the first channel from the terminal device; and
demodulate the first channel based on the demodulation reference signal;
the terminal device is further configured to:
generate a first sequence based on the radio frame number;
generate a second sequence based on a cell identifier;
generate a sequence of the demodulation reference signal based on the first sequence and the second sequence; and
map the sequence of the demodulation reference signal to a time-frequency resource, wherein the time-frequency resource is for sending the demodulation reference signal,
wherein the first sequence is $[\bar{w}(0), \bar{w}(1), \bar{w}(2)]$, the second sequence is $[\bar{r}_u(0), \bar{r}_u(1), \ldots, \bar{r}_u(K-1)\bar{r}_u(0), r_u(1) \ldots \bar{r}_u(K-1)]$, and the sequence of the demodulation reference signal is $r_u(3n+m) = \bar{w}(m)\bar{r}_u(n)$, wherein K is a length of the second sequence, $u = N_{ID}^{cell}$ mod 16, $N_{ID}^{cell}$ is the cell identifier, a value of m is {0, 1, 2}, and a value of n is {0, 1, 2, ..., K−1}.

14. The system according to claim 13, wherein the generating the first sequence based on the radio frame number comprises:
determining a sequence index based on the radio frame number and a pseudo-random sequence; and
determining the first sequence based on the sequence index.

15. The system according to claim 14, wherein the determining the sequence index based on the radio frame number and the pseudo-random sequence comprises:
determining the sequence index according to a formula $(\Sigma_{i=0}^{7} c(8f(n_f)+i) \cdot 2^i)$ mod 3, wherein c(n) is the pseudo-random sequence, $n_f$ is the radio frame number, $\Sigma$ is a summation operation, mod is a modulo operation, and $f(n_f)$ is determined based on the radio frame number.

16. The system according to claim 13, wherein the first channel is a physical uplink shared channel, and a format of the physical uplink shared channel is a format 2.

17. The system according to claim 13, wherein a subcarrier spacing of the first channel is 3.75 kHz, and the first channel supports an uplink/downlink configuration 1 and/or an uplink/downlink configuration 4 in time division duplex.

18. The system according to claim 13, wherein the first channel is transmitted by using two consecutive uplink subframes of a radio frame.

* * * * *

UNITED STATES PATENT AND TRADEMARK OFFICE
CERTIFICATE OF CORRECTION

PATENT NO. : 12,273,227 B2
APPLICATION NO. : 17/673605
DATED : April 8, 2025
INVENTOR(S) : Li et al.

It is certified that error appears in the above-identified patent and that said Letters Patent is hereby corrected as shown below:

In the Claims

Claim 1: Column 26, Lines 12-13: "second sequence is $[\bar{r}_u(0), \bar{r}_u(1), \ldots, (K-1)\bar{r}_u(0), \bar{r}_u(1) \ldots \bar{r}_u(K-1)]$, and the sequence of the demodu-" should read as -- second sequence is $[\bar{r}_u(0), \bar{r}_u(1), \ldots, \bar{r}_u(K-1)\bar{r}_u(0), \bar{r}_u(1) \ldots \ldots \bar{r}_u(K-1)]$, and the sequence of the demodu- --.

Claim 3: Column 26, Line 29: "$(\sum_{i=0}^{7} c(8f(n_f)+i) \cdot 2^i)$ mod 3, wherein c(n) is the pseudo-" should read -- $\left(\sum_{i=0}^{7} c(8f(n_f)+i) \cdot 2^i\right) \bmod 3$, wherein $c(n)$ is the pseudo- --.

Claim 7: Column 26, Line 65: "$\bar{r}_u(1) \ldots \bar{r}_u(K-1)]$, and the sequence of the demodu-" should read as -- $\bar{r}_u(1) \ldots \ldots \bar{r}_u(K-1)]$, and the sequence of the demodu- --.

Claim 13: Column 28, Line 11: "$r_u(1) \ldots \bar{r}_u(K-1)]$, and the sequence of the demodu-" should read as -- $\bar{r}_u(1) \ldots \ldots \bar{r}_u(K-1)]$, and the sequence of the demodu- --.

Signed and Sealed this
Seventh Day of October, 2025

John A. Squires
*Director of the United States Patent and Trademark Office*